United States Patent
Wang

(10) Patent No.: US 9,413,692 B2
(45) Date of Patent: Aug. 9, 2016

(54) LINE PROCESSING UNIT AND SWITCH FABRIC SYSTEM

(71) Applicant: Huawei Technologies Co., Ltd., Shenzhen (CN)

(72) Inventor: Yongsheng Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 14/502,277

(22) Filed: Sep. 30, 2014

(65) Prior Publication Data

US 2015/0016468 A1 Jan. 15, 2015

Related U.S. Application Data

(63) Continuation of application No. PCT/CN2012/075132, filed on May 7, 2012.

(51) Int. Cl.
*H04L 12/933* (2013.01)
*H04L 12/931* (2013.01)
*H04L 12/935* (2013.01)

(52) U.S. Cl.
CPC ............. *H04L 49/10* (2013.01); *H04L 49/351* (2013.01); *H04L 49/1523* (2013.01); *H04L 49/30* (2013.01); *H04L 49/40* (2013.01); *H04L 49/45* (2013.01)

(58) Field of Classification Search
CPC ................................ H04L 49/10; H04L 49/351
USPC ........................................................... 370/419
See application file for complete search history.

(56) References Cited

U.S. PATENT DOCUMENTS

| | | | |
|---|---|---|---|
| 2002/0061030 A1 | 5/2002 | Iny | |
| 2002/0075882 A1* | 6/2002 | Donis | H04L 49/205 370/412 |
| 2002/0126677 A1* | 9/2002 | Hathaway | H04L 49/3081 370/395.64 |
| 2003/0058880 A1 | 3/2003 | Sarkinen et al. | |
| 2004/0030766 A1* | 2/2004 | Witkowski | H04L 41/082 709/223 |
| 2009/0262741 A1* | 10/2009 | Jungck | H04L 29/12066 370/392 |
| 2010/0162271 A1* | 6/2010 | Arimilli | G06F 9/547 719/319 |
| 2012/0039173 A1 | 2/2012 | Danzig et al. | |
| 2012/0106564 A1 | 5/2012 | Chen et al. | |

FOREIGN PATENT DOCUMENTS

| | | |
|---|---|---|
| CN | 101252537 A | 8/2008 |
| CN | 101958824 A | 1/2011 |
| EP | 0357431 A2 | 3/1990 |
| JP | 2000295353 A | 10/2000 |
| WO | 2010090838 A2 | 8/2010 |

\* cited by examiner

*Primary Examiner* — Ronald B Abelson
(74) *Attorney, Agent, or Firm* — Slater Matsil, LLP

(57) ABSTRACT

A line processing unit and a switch fabric system are disclosed. The line processing unit includes an FIC and an FE. The FIC is connected to the FE through a first connection line. In embodiments of the present application, an LPU and a switching capability can be configured in demand.

12 Claims, 5 Drawing Sheets

LINE PROCESSING UNIT AND SWITCH FABRIC SYSTEM

This application is a continuation of International Application No. PCT/CN2012/075132, filed on May 7, 2012, which is hereby incorporated by reference in its entirety.

TECHNICAL FIELD

The present application relates to the field of network communications technologies and, in particular embodiments, to a line processing unit and a switch fabric system.

BACKGROUND

Switching processing can be completed for a packet by a fabric interface controller (FIC) and a fabric element (FE). The FIC is generally located on a line processing unit (LPU), and the FE is generally located on a switch fabric unit (SFU) independent of the LPU. In the prior art, in a large-capacity switching system, each FIC on an LPU is connected to each FE on all SFUs. According to the connection relationship, full SFU configuration is required regardless of the number of LPUs to allow a packet to be switched from a port of an LPU to any other port. For example, in the case of full configuration, the number of SFUs is 3. In this case, three SFUs need to be configured no matter whether one, two, or more LPUs exist.

However, a user generally performs expansion gradually when using a fabric. Only a few LPUs need to be configured during initial configuration, and expansion may be performed to increase the number of LPUs after several years. In this case, if full SFU configuration is performed during initial configuration, costs during initial configuration are relatively high because the SFU is a costly device.

SUMMARY

Embodiments of the present application provide a line processing unit and a switch fabric system to reduce configuration costs.

An embodiment of the present application provides a line processing unit that includes an FIC and an FE. The FIC is connected to the FE through a first connection line.

An embodiment of the present application provides a switch fabric system including a first LPU and a backplane. The first LPU includes a first FIC and a first FE. The first FIC is connected to one end of the first FE through a first connection line. The backplane is connected to the first FIC through a second connection line.

As can be seen from the technical solutions, in the embodiments of the present application, an FE is disposed on an LPU and an SFU is removed. This may implement that an LPU and a switching capability (or an FE) are configured in demand, thereby reducing configuration costs.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show some embodiments of the present application, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present application more comprehensible, the following clearly describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1A:
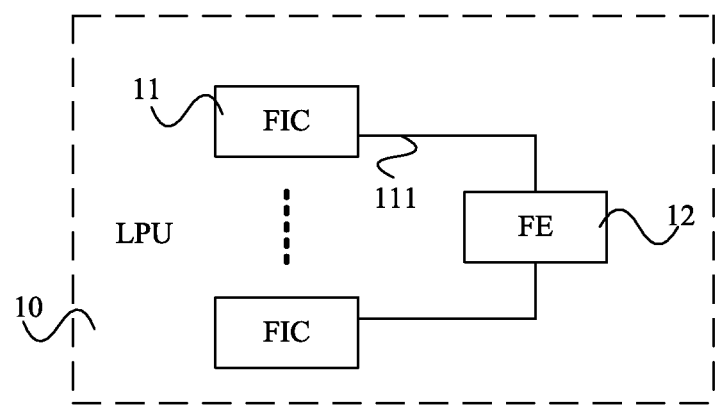
FIG. 1a is a schematic structural diagram of an embodiment of a line processing unit according to the present application.

FIG. 1a is a schematic structural diagram of an embodiment of a line processing unit according to the present application. An LPU 10 includes an FIC 11 and an FE 12, where the FIC 11 is connected to the FE 12 through a first connection line 111.

The number of the FICs may be one or more, the number of the FEs may be also one or more. In this case, the number of the first connection lines is the product of the number of the FICs and the number of the FEs, and any FIC is connected to any FE through a different first connection line. For example, three FICs and two FEs are disposed in an LPU and respectively indicated by FIC1, FIC2, and FIC3, and FE1 and FE2. In this situation, six first connection lines exist and are respectively indicated by first connection line_1, first connection line_2, first connection line_3, first connection line_4, first connection line_5, and first connection line_6. In this situation, specific connection relationships may be as follows: FIC1 is connected to FE1 through first connection line_1, FIC1 is connected to FE2 through first connection line_2, FIC2 is connected to FE1 through first connection line_3, FIC2 is connected to FE2 through first connection line_4, FIC3 is connected to FE1 through first connection line_5, and FIC3 is connected to FE2 through first connection line_6. A structure corresponding to subsequent similar connection relationships may be similar to the description herein.

Figure 1B:
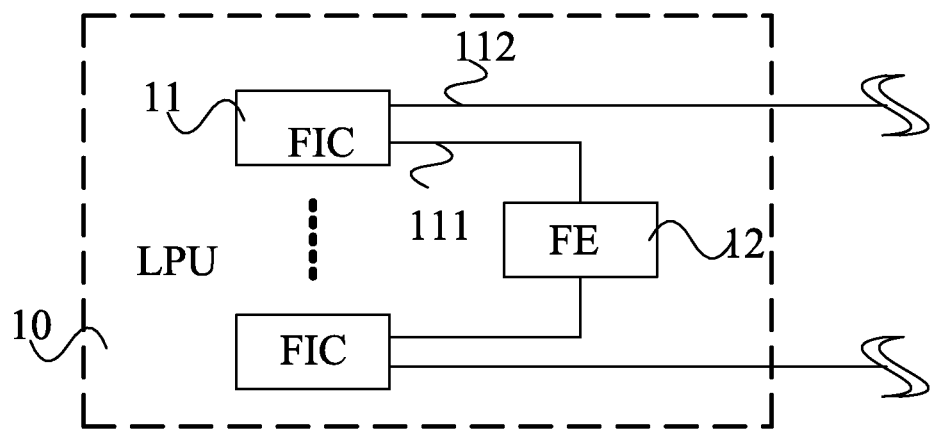
FIG. 1b is a schematic structural diagram of another embodiment of a line processing unit according to the present application.

Further, referring to FIG. 1b, the FIC 11 is further configured to be connected to a backplane through a second connection line 112.

Optionally, the second connection line is connected to the other end of the FE after passing through a dummy plate, where the dummy plate is disposed in a vacant slot of the backplane.

In the embodiment, both an FE and an FIC are located on an LPU, and therefore configuration can be performed in demand. For example, when only one LPU is required, only one LPU may be configured. Each LPU includes an FIC and an FE, and therefore switching between ports can be implemented, whereas in the prior art, full SFU configuration is required to implement switching between any ports.

In the embodiment, an FE is located on an LPU rather than an SFU. Therefore, an SFU is not required during fabric deployment. In addition, the number of FEs increases with the increase of the number of LPUs. In this way, only a number of FE(s) corresponding to the number of LPU(s) need(s) to be configured during initial configuration, thereby avoiding the problem of relatively high costs due to full SFU configuration.

Base on the LPU described in the foregoing, an embodiment of the present application further provides a switch fabric system, including a first LPU and a backplane. The first LPU includes a first FIC and a first FE, where the first FIC is connected to one end of the first FE through a first connection line. The backplane is connected to the first FIC through a second connection line.

Optionally, the system may further include a dummy plate, located in a vacant slot of the backplane, where the dummy plate includes a printed circuit board (PCB) and a connector disposed on the PCB. The connector is configured to be connected to the backplane, so that the second connection line is connected to the other end of the first FE after passing through the dummy plate.

Optionally, the system may further include a second LPU, where the second LPU includes a second FIC and a second FE. The second FIC is connected to one end of the second FE through a third connection line. The second FIC further is connected to the backplane through a fourth connection line. The first FIC further is connected to the other end of the second FE through the second connection line and the backplane. The second FIC further is connected to the other end of the first FE through the fourth connection line and the backplane.

That is to say, the system may include an LPU and a backplane, or include an LPU, a backplane, and a dummy plane.

Optionally, if the system includes an LPU and a backplane, one or more first FICs exist, and one or more first FEs exist. The number of the first connection lines is the product of the number of the first FICs and the number of the first FEs. Any first FIC is connected to any first FE through a different first connection line.

Further, when there are at least two LPUs exist, one or more first FICs exist, one or more first FEs exist, one or more second FICs exist, and one or more second FEs exist. The number of the first connection lines is the product of the number of the first FICs and the number of the first FEs. The number of the third connection lines is the product of the number of the second FICs and the number of the second FEs. The number of the second connection lines is the product of the number of the first FICs and the number of the second FEs. The number of the fourth connection lines is the product of the number of the second FICs and the number of the first FEs. Any first FIC is connected to one end of any first FE through a different first connection line. Any second FIC is connected to one end of any second FE through a different third connection line. Any first FIC further is connected to the other end of any second FE through a different second connection line and the backplane. Any second FIC further is connected to the other end of any first FE through a different fourth connection line and the backplane.

Figure 2:
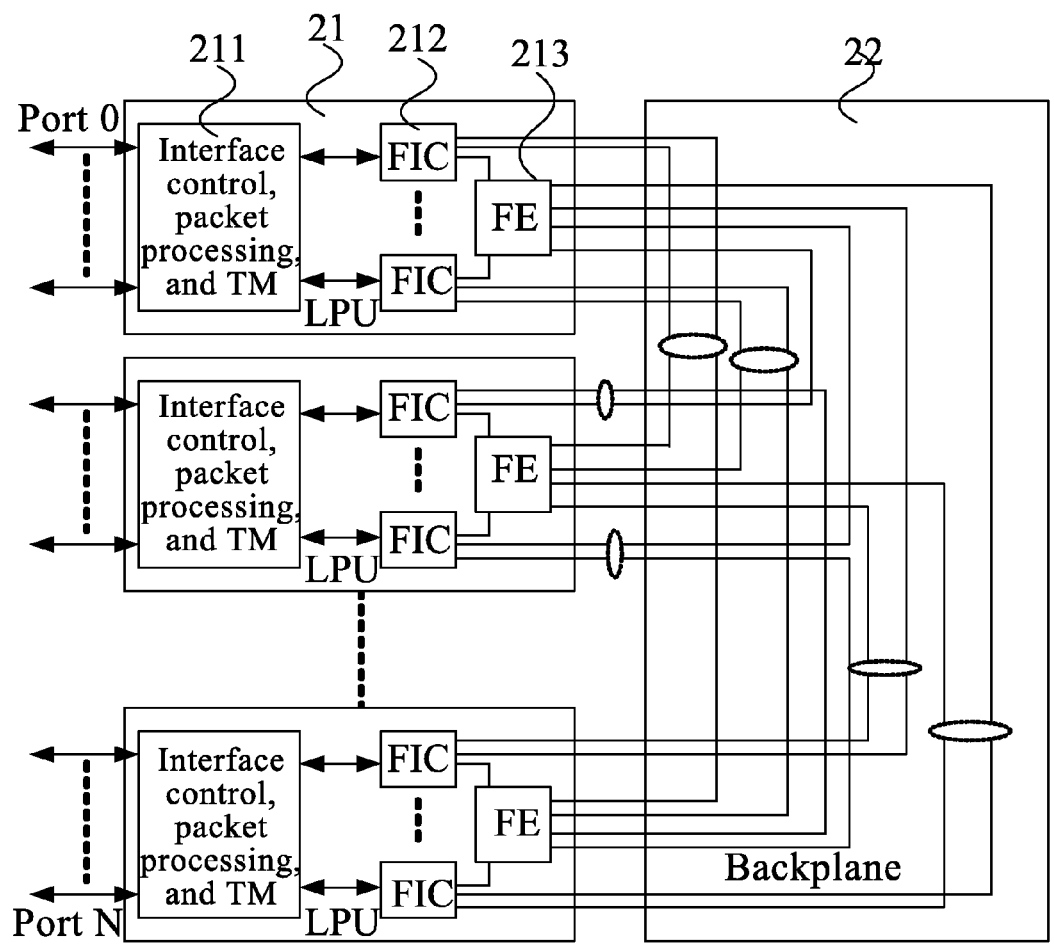
FIG. 2 is a schematic structural diagram of an embodiment of a switch fabric system according to the present application.
Figure 3:
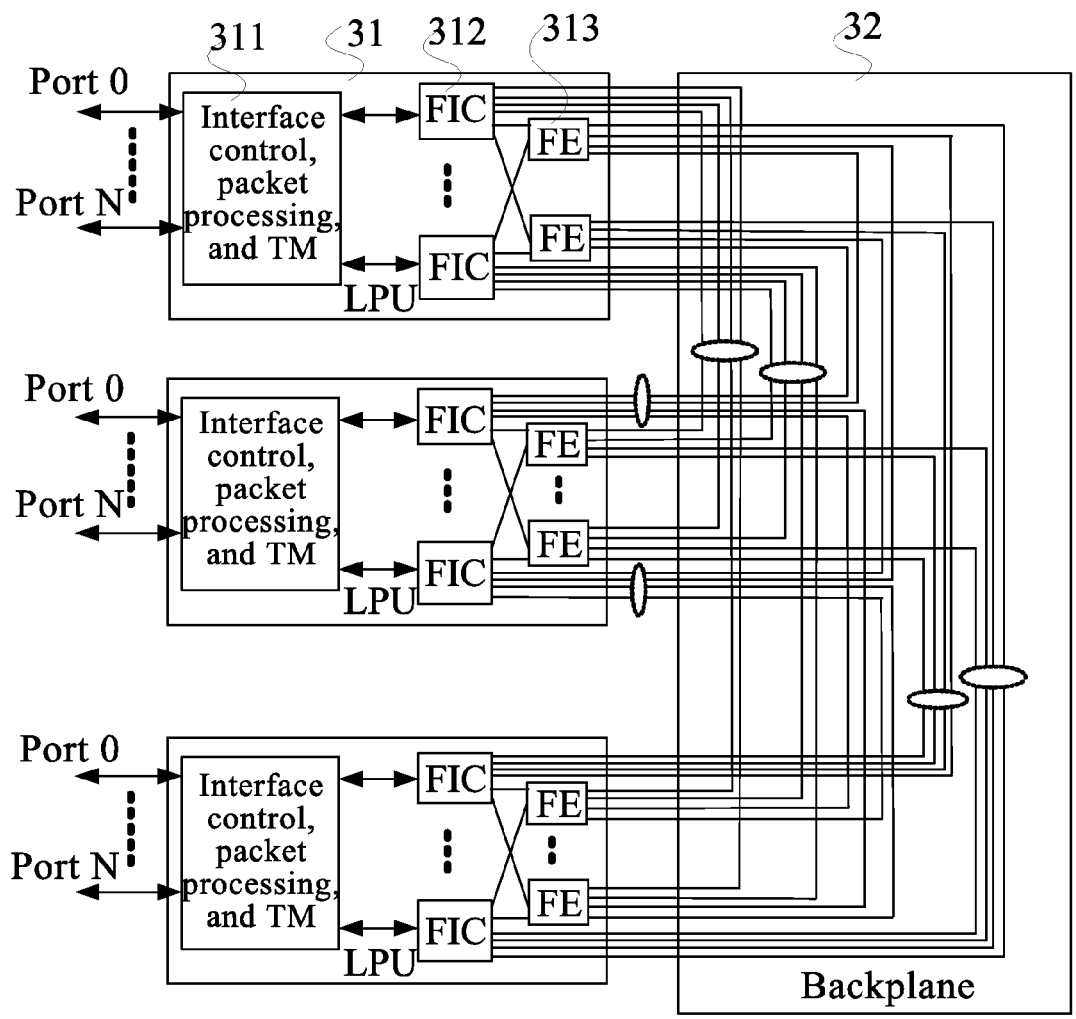
FIG. 3 is a schematic structural diagram of another embodiment of a switch fabric system according to the present application.

For details, reference may be made to the embodiment illustrated in FIG. 2 or FIG. 3.

FIG. 2 is a schematic structural diagram of an embodiment of a switch fabric system according to the present application. The switch fabric system includes at least two LPUs 21. The LPUs 21 are connected through a backplane (backplane/Cable/Fiber) 22. Each of the LPUs 21 includes a module 211 for interface control, packet processing, and traffic management (TM) (which is simplified as interface control, packet processing, and TM in the figure), an FIC 212, and an FE 213. Functions of the module 211 for interface control, packet processing, and TM, the FIC 212, and the FE 213 are the same as those in the prior art. Different from the prior art, in the embodiment, an FE is located on an LPU rather than an SFU independent of the LPU. The backplane in the embodiment of the present application is a generalized definition and can not only be implemented by adopting a printed circuit board (PCB), but can also be implemented by adopting a cable, an optical fiber, or the like.

The number of the FICs may be one or more. The number of the FEs may be also one or more.

Referring to FIG. 2, that each LPU includes one FE is taken as an example. Each FIC in each LPU is connected to the FE in the LPU, and each FIC in an LPU is connected to an FE in each of other LPU(s) through a backplane.

In the embodiment, an FE is configured on the LPU, and an FIC is connected to an FE in the LPU where it is located. This may implement packet switching between any ports of each LPU. The number of LPUs can be configured in demand. In addition, when multiple LPUs exist, an FIC in an LPU is connected to FEs in other LPUs. This may implement packet switching between any ports of different LPUs.

FIG. 3 is a schematic structural diagram of another embodiment of a switch fabric system according to the present application. Different from the embodiment illustrated in FIG. 1 or FIG. 2, the number of FEs in each LPU is not limited to 1 and multiple FEs may exist. In FIG. 3, that each LPU includes two FEs, is taken as an example. In the embodiment, an LPU 31 includes a module 311 for interface control, packet processing, and TM, an FIC 312, and an FE 313, where multiple FEs 313 exist in each LPU, and LPUs 31 are connected through a backplane 32.

Each FIC in each LPU is connected to each FE in the LPU, and each FIC further is connected to each FE in other LPUs.

In the embodiment, a corresponding number of FEs can be configured according to performance of an FE. For example, when the needed switching capacity for packets is 1600 G, two FEs may be configured in each LPU if the switching capacity of the FE is 800 G, and one FE may be configured if the switching capacity of the FE is 1600 G.

In the embodiment, the number of FEs in each LPU is not limited. An appropriate number of FEs can be selected according to a capability of an FE to meet requirements of different scenarios.

Optionally, if the system includes an LPU, a backplane, and a dummy plate, one or more first FICs exist, and one or more first FEs exist. The number of the first connection lines is the product of the number of the first FICs and that of the first FEs, as well as the number of the second connection lines is the product of the number of the first FICs and that of the first FEs. Any first FIC is connected to one end of any first FE through a different first connection line. Any first FIC further is connected to the other end of any first FE through a different second connection line and the dummy plate. For details, reference may be made to the embodiment illustrated in FIG. 4 or FIG. 5.

Figure 4:
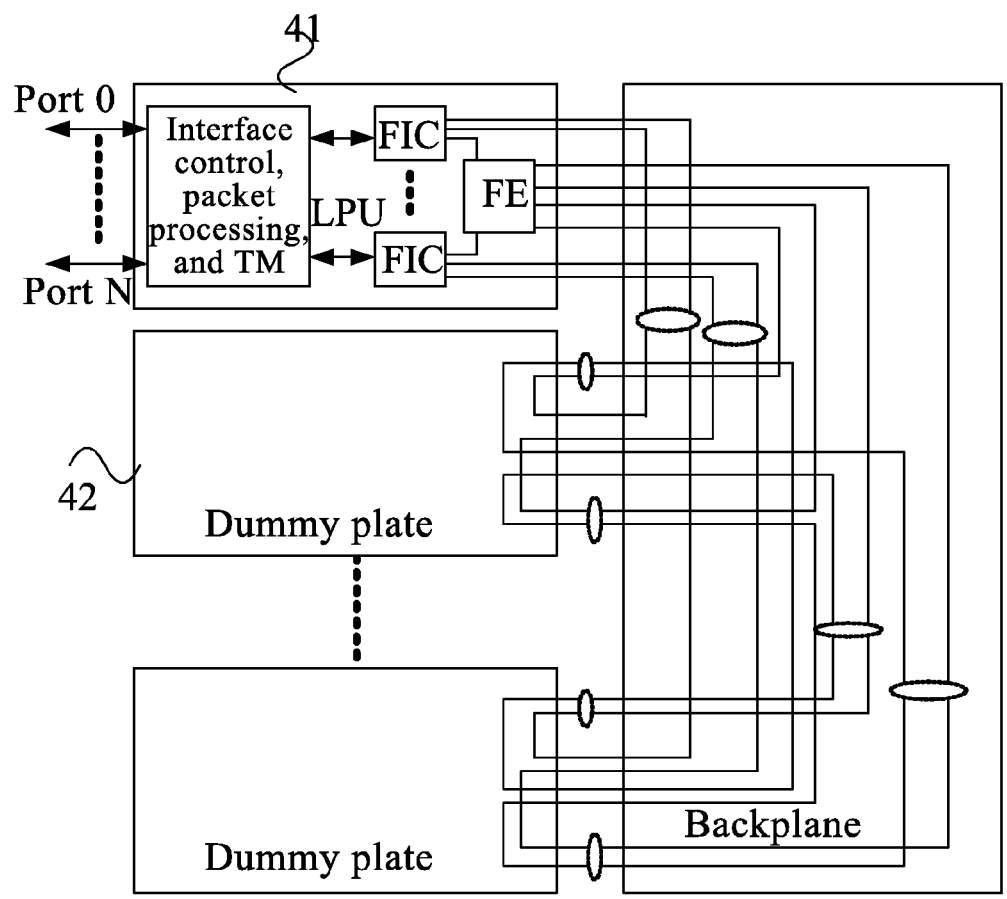
FIG. 4 is a schematic structural diagram of another embodiment of a switch fabric system according to the present application.

FIG. 4 is a schematic structural diagram of another embodiment of a switch fabric system according to the present application. The number of LPUs can be configured in demand. Therefore, a vacant slot where no LPU needs to be configured probably exists during initial configuration. In this case, a relationship between an LPU and the vacant slot needs to be considered.

In the embodiment, the fabric includes an LPU 41 and a dummy plate 42 is configured in a vacant slot. The dummy plate provides only a line connection and does not implement a specific switching function. The dummy plate may include a printed circuit board (PCB) and a connector.

In the embodiment, each FIC in each LPU is connected to one end of each FE in the LPU, and each dummy plate includes a connector, so that a connection line connecting each FIC is connected to the other end of an FE in the LPU where the FIC is located after passing through the dummy plate.

For example, N slots exist on the fabric. An LPU is configured in slot 1, and dummy plates are configured in the vacant N−1 slots. In addition, a connection line of an FIC in an LPU is connected to one end of an FE in the LPU after passing through a dummy plate. That is to say, the connection line, passing through the dummy plate, of the FIC is connected back to an FE of the local LPU.

Figure 5:
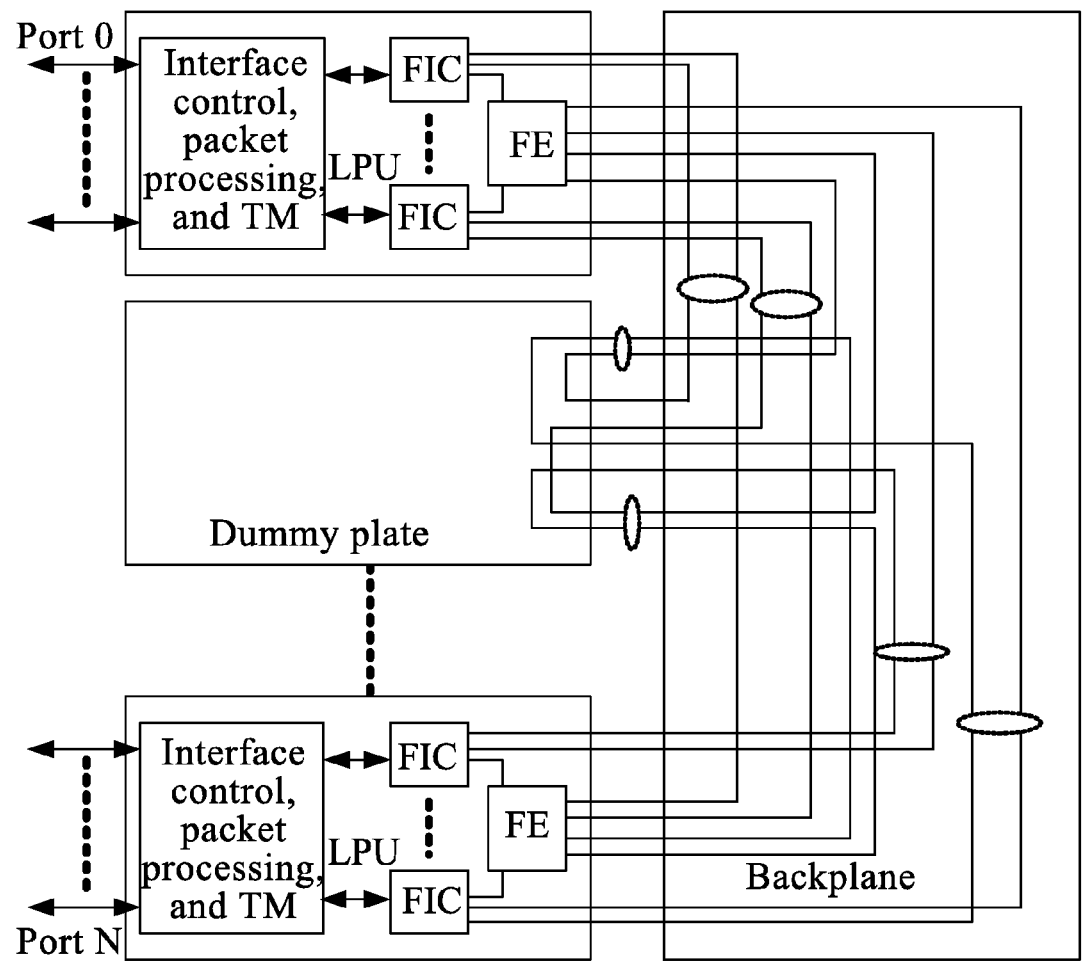
FIG. 5 is a schematic structural diagram of another embodiment of a switch fabric system according to the present application.

According to the connection relationship between an LPU and a dummy plate, after an LPU is added, it can be ensured that an FIC in each LPU is connected to FEs in other LPUs. For example, refer to FIG. 5. FIG. 5 is a schematic structural diagram of another embodiment of a switch fabric system according to the present application. Assume that an LPU needs to be added, and the added LPU replaces a dummy plate. For example, based on the illustration of FIG. 4, assume that an LPU needs to be disposed in slot N. In this case, the dummy plate in slot N is removed and the added LPU is inserted into slot N.

The preceding connection relationship exists between an LPU and a dummy plate. Therefore, when the LPU is inserted into slot N in replace of the dummy plate, the following connection relationships may exist between the LPU in slot N and the LPU in slot 1. An FIC in the LPU in slot 1 is connected to each FE in the LPU in slot N, and each FIC in the LPU in slot N further is connected to each FE in the LPU in slot 1. In this way, packet switching can be implemented between any ports of different LPUs.

In the embodiment, a dumpy plate is disposed and the preceding connection relationship is allowed between the dummy plate and an LPU. When an LPU needs to be added, it can be ensured that an interconnection relationship exists between FICs and FEs in LPUs after the addition, thereby implementing packet switching between any ports.

Persons of ordinary skill in the art may understand that all or part of the steps of the methods in the embodiments may be implemented by a program instructing relevant hardware. The program may be stored in a computer readable storage medium. When the program is run, the steps of the methods in the embodiments are performed. The storage medium may be any medium capable of storing program codes, such as a ROM, a RAM, a magnetic disk, or an optical disk.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments, or make equivalent substitutions to some technical features thereof, without departing from the scope of the technical solutions of the embodiments of the present application.

What is claimed is:

1. A line processing unit, comprising:
    a fabric interface controller (FIC),
    fabric element (FE); and
    a first connection line, wherein the FIC is connected to the FE through the first connection line, the FIC is configured to be connected to a backplane through a second connection line, and the second connection line is connected to an other end of the FE after passing through a dummy plate disposed in a vacant slot of the backplane.

2. The line processing unit according to claim 1, wherein the number of the FICs is one or more, the number of the FEs is one or more, the number of the first connection lines is the product of the number of the FICs and the number of the FEs, and any FIC is connected to any FE through a different first connection line.

3. The line processing unit according to claim 1, wherein the number of the FICs is one or more, the number of the FEs is one or more, the number of the first connection lines is the product of the number of the FICs and the number of the FEs, and any FIC is connected to any FE through a different first connection line.

4. A switch fabric system, comprising:
    a first line processing unit (LPU) that comprises a first fabric interface controller (FIC) and a first fabric element (FE), the first FIC being connected to one end of the first FE through a first connection line;
    a backplane, connected to the first FIC through a second connection line; and
    a dummy plate, located in a vacant slot of the backplane, wherein the dummy plate comprises a printed circuit board (PCB) and a connector disposed on the PCB, the connector being configured to be connected to the backplane.

5. The system according to claim 4, further comprising a second LPU that comprises a second FIC and a second FE, the second FIC being connected to one end of the second FE through a third connection line, the second FIC also connected to the backplane through a fourth connection line.

6. The system according to claim 4, wherein the first FIC further is connected to the other end of the second FE through the second connection line and the backplane, and the second FIC further is connected to the other end of the first FE through the fourth connection line and the backplane.

7. The system according to claim 4, further comprising a second LPU that comprises a second FIC and a second FE, the second FIC being connected to one end of the second FE through a third connection line, the second FIC also being connected to the backplane through a fourth connection line.

8. The system according to claim 7, wherein the first FIC further is connected to the other end of the second FE through the second connection line and the backplane, and the second FIC further is connected to the other end of the first FE through the fourth connection line and the backplane.

9. The system according to claim 4, wherein the number of the FICs is one or more, the number of the FEs is one or more, the number of the first connection lines is the product of the number of the first FICs and the number of the first FEs, and any first FIC is connected to any first FE through a different first connection line.

10. The system according to claim 4, wherein the number of the first FICs is one or more, the number of the first FEs is one or more, the number of the first connection lines is the product of the number of the first FICs and the number of the first FEs, the number of the second connection lines is the product of the number of the first FICs and the number of the first FEs, each first FIC is connected to one end of each first FE through a different first connection line, and any first FIC further is connected to an other end of any first FE through a different second connection line and the dummy plate.

11. The system according to claim 6, wherein the number of the first FICs is one or more, the number of the first FEs is one or more, the number of the second FICs is one or more, the number of the second FEs is one or more, the number of the first connection lines is the product of the number of the first FICs and the number of the first FEs, the number of the third connection lines is the product of the number of the second FICs and the number of the second FEs, the number of the second connection lines is the product of the number of the first FICs and the number of the second FEs, the number of the fourth connection lines is the product of the number of the second FICs and the number of the first FEs, any first FIC is connected to one end of any first FE through a different first connection line, any second FIC is connected to one end of any second FE through a different third connection line, any first FIC further is connected to another end of any second FE through a different second connection line and the backplane, and any second FIC further is connected to an other end of any first FE through a different fourth connection line and the backplane.

12. The system according to claim 8, wherein the number of the first FICs is one or more, the number of the first FEs is one or more, the number of the second FICs is one or more, the number of the second FEs is one or more, the number of the first connection lines is the product of the number of the first FICs and the number of the first FEs, the number of the third connection lines is the product of the number of the second FICs and the number of the second FEs, the number of the second connection lines is the product of the number of the first FICs and the number of the second FEs, the number of the fourth connection lines is the product of the number of the second FICs and the number of the first FEs, any first FIC is connected to one end of any first FE through a different first connection line, any second FIC is connected to one end of any second FE through a different third connection line, any first FIC further is connected to an other end of any second FE through a different second connection line and the backplane, and each second FIC further is connected to an other end of any first FE through a different fourth connection line and the backplane.

* * * * *